United States Patent [19]

Uehara

[11] Patent Number: 5,283,903
[45] Date of Patent: Feb. 1, 1994

[54] PRIORITY SELECTOR

[75] Inventor: Izushi Uehara, Tokyo, Japan

[73] Assignee: NEC Corporation, Tokyo, Japan

[21] Appl. No.: 759,947

[22] Filed: Sep. 17, 1991

Related U.S. Application Data

[63] Continuation of Ser. No. 553,364, Jul. 17, 1990, which is a continuation of Ser. No. 136,954, Dec. 23, 1987, abandoned.

[30] Foreign Application Priority Data

Dec. 25, 1986 [JP] Japan .................................. 61-314765

[51] Int. Cl.⁵ .............................................. G06F 13/37
[52] U.S. Cl. .................................................. 395/725
[58] Field of Search ................. 395/725; 364/200, 900

[56] References Cited

U.S. PATENT DOCUMENTS

| | | | |
|---|---|---|---|
| 3,553,656 | 1/1971 | Bernhardt | 364/900 |
| 3,983,540 | 9/1976 | Keller et al. | 340/172.5 |
| 4,096,572 | 1/1978 | Namimoto | 364/200 |
| 4,130,864 | 12/1978 | Schlotterer | 364/200 |
| 4,257,095 | 3/1981 | Nadir | 364/200 |
| 4,314,335 | 2/1982 | Pezzi | 364/200 |
| 4,320,457 | 3/1982 | Tanikawa | 364/200 |
| 4,400,771 | 8/1983 | Suzuki et al. | 364/200 |
| 4,488,218 | 12/1984 | Grimes | 364/200 |
| 4,493,036 | 1/1985 | Boudreau et al. | 364/200 |
| 4,722,072 | 1/1988 | Price | 364/900 |
| 4,803,653 | 2/1988 | Suzuki et al. | 364/900 |
| 4,829,467 | 3/1989 | Ogata | 364/900 |

Primary Examiner—Dale M. Shaw
Assistant Examiner—C. Shin
Attorney, Agent, or Firm—Foley & Lardner

[57] ABSTRACT

A priority selector of a system including a plurality of processors and a shared source commonly used by the processors sets a priority of requests supplied from the processors for using the shared source and supplies a use permission to a single processor. The priority selector has a plurality of lock request priority setting circuits corresponding to the processors and a request selector. When a contention occurs between an own request from a processor and other request from another processor, the corresponding lock request priority setting circuit upgrades the non-permitted own request as a high priority request when the other request is permitted, and downgrades a following own request as a low priority request when the own request is accepted. The request selector receives requests from the processors, the priority of which is set by the lock request priority setting circuits, selects a high priority request prior to a low priority request, and selects a request in accordance with a predetermined priority when the received requests are of the same priority.

1 Claim, 2 Drawing Sheets

PRIORITY SELECTOR

This application is a continuation of application Ser. No. 07/553,364, filed Jul. 17, 1990, which is a continuation of application Ser. No. 07/136,954, filed on Dec. 23, 1987, now abandoned.

BACKGROUND OF THE INVENTION

The present invention relates to a priority selector and, more particularly, to a priority selector for a data processing system in which a plurality of processors share a main memory, wherein the selector allows the processors to use the main memory in accordance with a predetemined priority in response to requests from the processors.

Various conventional priority selectors have been proposed for a data processing system. According to one conventional priority selector, when a plurality of processors use a main memory independently, they output lock requests. When a plurality of lock requests contend, one lock request is selected in accordance with a predetermined priority. In another conventional priority selector, priority is determined in accordance with a so-called LRU (Least Recently Used) scheme. According to this method, the history of selected processors when lock request contentions occurred is managed, and the past history is reflected when the next lock request contention occurs.

In the conventional priority selectors described above, the priority of the processors is preset to be constant. When lock requests are often supplied from processors of higher priorities, a lock request from a processor of lower priority is not accepted. As a result, the lock request success frequencies are not uniform among the processors. In addition, processing at a processor of lower priority must be delayed until its lock request is accepted, resulting in variations in the processing capacities of the processors. When the priority is determined in accordance with the LRU scheme or the like, hardware for compensating for lock contention is excessively large compared to the lock contention frequency.

SUMMARY OF THE INVENTION

It is an object of the present invention to provide a priority selector which eliminates the above problems of the conventional technique, prevents reductions in processing capacities of processors due to lock request contentions, and has a simple circuit configuration.

According to the present invention, there is provided a priority selector system including a plurality of processors and a shared source commonly used by the plurality of processors, which sets priority for requests supplied from the plurality of processors for using the shared source and supplies permission to use the source, comprising:

a plurality of lock request priority setting means, each of which is provided for a corresponding one of the processors and, each of which when a contention occurs between a request from a corresponding processor (referred to as the "own" request hereinafter) and another request from another processor (referred to as the "other" request hereinafter), upgrades non-permitted "own" request as a high priority request when the "other" request is permitted, and downgrades a following "own" request as a low priority request when the "own" request is permitted; and a request selection means for receiving requests from the processors, the priority of which is set by the lock request priority setting means, selecting a high priority request prior to a low priority request, and selecting requests in accordance with a predetermined priority when the requests are of the same priority.

DETAILED DESCRIPTION OF THE PREFERRED EMBODIMENT

An embodiment of the present invention will be described by referring to the accompanying drawings.

Figure 1:
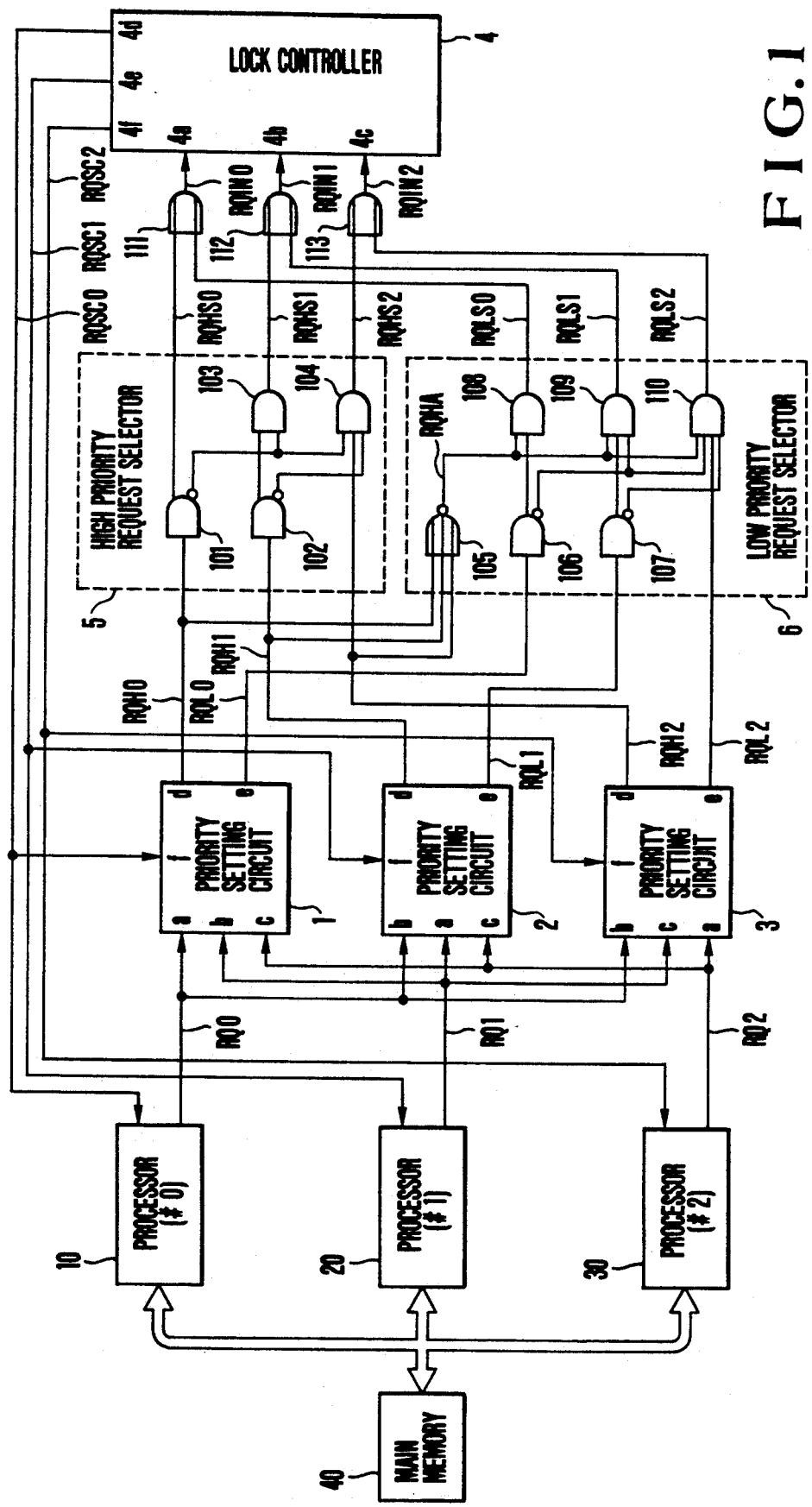
FIG. 1 is a block diagram of an embodiment of the present invention.

FIG. 1 is a block diagram of an embodiment of the present invention. Referring to FIG. 1, processors (#0) 10, (#1) 20, and (#2) 30 share a main memory 40. The suffixes 0, 1, and 2 to the signals in FIG. 1 which respectively correspond to the processors 10, 20, and 30. Priority setting circuits 1, 2, and 3, having the same arrangement, respectively correspond to the processors 10, 20, and 30. An input terminal a of each of the priority setting circuits 1 to 3 is connected to the output of the corresponding processor 10, 20, or 30, and remaining input terminals b and c thereof are connected to the outputs of the remaining ones of the processors 10, 20, and 30. The priority setting circuit upgrades the priority of the "own" lock request RQ0 supplied from the corresponding processor 10 to a high level or downgrades it to a low level when the lock request RQ0 contends with "other" lock requests RQ1 or RQ2. In this case, the high and low priorities are expressed by setting signals RQH0 and RQL0 output from the output terminals d and e, respectively, at high level "1". Whether the output signals from the output terminal d or e are set at high level "1" or low level "0" is determined in accordance with the state "1" or "0" of the signal input to a control terminal f of the priority setting circuit 1.

The priority setting circuits 2 and 3 have the same arrangement as the priority setting circuit 1.

An output terminal d of each of the priority setting circuits 1, 2, and 3 is connected to both high and low priority request selectors 5 and 6. An output terminal e of each of the priority setting circuits 1, 2, and 3 is connected to the low priority request selector 6.

The output signal RQH0 of the priority setting circuit 1 serves as an input to an AND gate 101 of the high priority request selector 5 and one input to a NOR gate 105 of the low priority request selector 6. The output signal RQL0 from the output terminal e of the priority setting circuit 1 serves as an input to an AND gate 106 of the low priority request selector 6.

An output signal RQH1 from the output terminal d of the priority setting circuit 2 serves as an input to an AND gate 102 of the high priority request selector 5 and another input to the NOR gate 105 of the low priority request selector 6. An output signal RQL1 of the output terminal e of the priority setting circuit 2 serves as an input to an AND gate 107 of the low priority request selector 6.

An output signal RQH2 of the output terminal d of the priority setting circuit 3 serves as an input to an AND gate 104 of the high priority request selector 5 and the remaining input to the NOR gate 105 of the low priority request selector 6. An output signal RQL2 of the output terminal e of the priority setting circuit 3 serves as an input to an AND gate 110 of the low priority request selector 6.

The high priority request selector 5 includes, in addition to the AND gates 101, 102, and 104, an AND gate 103 that receives an inverted output signal from the AND gate 101 and a non-inverted output signal from the AND gate 102. A non-inverted output signal of the AND gate 101 serves as a high priority request selection signal RQHS0 corresponding to the processor 10, and serves as an input to an OR gate 111. The AND gate 103 outputs a high priority request selection signal RQHS1 corresponding to the processor 20 to an OR gate 112. The AND gate 104 receives, in addition to the input from the priority setting circuit 3, inverted output signals from the AND gates 101 and 102, and outputs a high priority request selection signal RQHS2 corresponding to the processor 30 to a OR gate 113.

The priority in the high priority request selector 5 having the above arrangement is set in the order of the processors 10, 20, and 30. One of the high priority request selection signals RQHS0 to RQHS2 is set at "1" in accordance with this priority.

In the low priority request selector 6, an output signal RQHA of the NOR gate 105 serves as inputs to AND gates 108, 109 and 110 in order to turn on/off these AND gates 108 to 110. More specifically, when at least one of high priority requests RQH0 to RQH2 is at "1", a high priority request is selected prior to a low priority request. The AND gate 108 ANDs the output signal RQHA from the NOR gate 105 and the non-inverted signal from the AND gate 106, and outputs a low priority request selection signal RQLS0 corresponding to the processor 10 to the OR gate 111. The AND gate 109 receives a signal RQHA, the inverted output signal of the AND gate 106, and the non-inverted output signal of the AND gate 107, and outputs a low priority request selection signal RQLS1 corresponding to the processor 20 to the OR gate 112. The AND gate 110 receives the output signal RQL2 from the priority setting circuit 3, the output signal RQHA from the NOR gate 105, and the inverted output signals from the AND gates 106 and 107, and outputs a low request selection signal RQLS2 corresponding to the processor 30 to the OR gate 113.

In the low priority request selector 6 having the above arrangement, when two or more low priority requests are input simultaneously, one low priority request is selected in accordance with the order which is the same as that in the high priority request selector 5, and one of the low priority request selection signals RQLS0 to RQLS2 corresponding to the selected request is set at "1".

The OR gates 111, 112, and 113 receive output signals RQHS0 and RQLS0, RQHS1 and RQLS1, and RQHS2 and RQLS2 each from the high and low priority request selectors 5 and 6, respectively, and output lock request input signals RQIN0, RQIN1, and RQIN2 to the input terminals 4a, 4b, and 4c, respectively, of a lock controller 4.

The input terminals 4a, 4b, and 4c of the lock controller 4 correspond to its output terminals 4d, 4e, and 4f outputting lock success signal RQSC0, RQSC1 and RQSC2, respectively. One of lock success signals RQSC0, RQSC1, and RQSC2 at "1" in accordance with the states of the lock request input signals RQIN0, RQIN1, and RQIN2. The lock success signals RQSC0, RQSC1, and RQSC2 are supplied to the corresponding processors 10, 20, and 30, and to the terminals f of the corresponding priority setting circuits 1, 2, and 3 as described above.

The lock success signals RQSC0 to RQSC2 supplied from the lock controller 4 indicate lock success to the corresponding processors 10 to 30. When one of these signals is set at "1", a corresponding processor is permitted to lock the main memory 40. When one of these signals is set at logic "0", a corresponding processor is not permitted to lock the main memory 40. The processors 10, 20, and 30 continue to output lock requests RQ0 to RQ2 until the corresponding lock success signals RQSC0 to RQSC2 are set at "1".

The operation of the circuit shown in FIG. 1 will be described for a case wherein the processors (#1) 20 and (#2) 30 simultaneously generate lock requests.

The priority of lock request signals RQ1 and RQ2 is set by the priority setting circuits 2 and 3. When both the signals RQ1 and RQ2 have high priority, the signals RQH1 and RQH2 are set at "1" and are input to the high priority request selector 5. Since two or more high priority requests occur at once, the high priority selector 5 selects either high priority request in accordance with the order of the processors 10, 20, and 30 as described above, the high priority request RQH1 is output through the AND gates 102 and 103. Thus, the request selection signal RQHS1 is set at "1", the lock request input signal RQIN1 is set at "1" by the OR gate 112, and accordingly a lock request is supplied from the processor 20 to the lock controller 4.

Upon reception of the lock request, the lock controller 4 sets the lock success signal RQSC1 at logic "1" and, if the processor 20 can be locked, locks the processor 20. The respective processors 10 and 30 continue to generate lock requests until the lock success signals RQSC0 to RQSC2 are output.

When the lock request signals RQ1 and RQ2 simultaneously generated by the processors 20 and 30 are determined as the low priority requests by the priority setting circuits 2 and 3, respectively, the signals RQL1 and RQL2 are set at logic "1" and input to the low priority request selector 6. Since the priority in low priority request selector 6 is the same as that in the high priority request selector 5 as described above, the low priority request selection signal RQLS1 is set at "1", and as a result the lock request input signal RQIN1 is set at logic "1" and input to the lock controller as the lock request from the processor 20.

When the lock request signals RQ1 and RQ2 simultaneously generated by the processors 20 and 30 are determined as low and high priority requests, respectively, by the priority setting circuits 2 and 3, the signals RQL1 and RQH2 are set at "1". The low priority request RQL1 is input to the low priority selecting circuit 6. However, since the high priority request RQH2 is at "1", a gate on/off control signal RQHA output from the OR gate 105 is at "0", and thus all the low priority requests are inhibited by the AND gates 108 to 110. Therefore, the high priority request selection signal RQH2 and the lock request input signal RQIN2 are respectively set at logic "1". The lock request of the processor 30 is selected and input to the lock controller 4.

Figure 2:
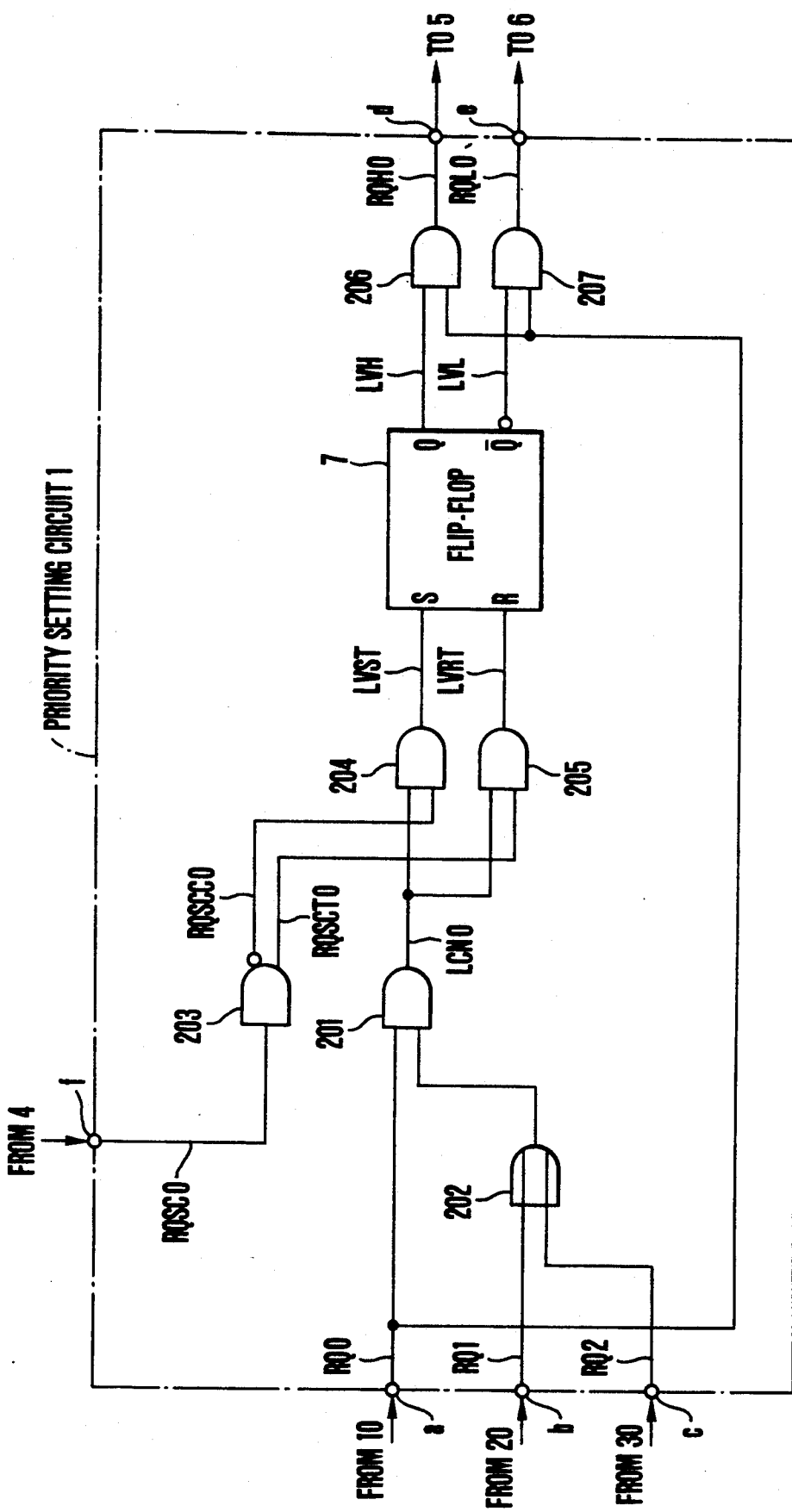
FIG. 2 is a circuit diagram of an embodiment of a priority setting circuit shown in FIG. 1.

FIG. 2 shows an embodiment of the priority setting circuit shown in FIG. 1, that is, the arrangement of the priority setting circuit 1 corresponding to the processor 10. Other priority setting circuits 2 and 3 have precisely the same arrangement.

Referring to FIG. 2, the lock requests RQ1 and RQ2 among the lock requests supplied from the processors 10, 20, and 30 excluding the "own" lock request RQ0 are input to the two inputs of an OR gate 202. The output from the OR gate 202 and the lock request RQ0 are supplied to the two inputs of an AND gate 201. Thus, the AND gate 201 outputs a lock request contention signal LCN0 representing occurrence of the lock request contention between the "own" lock request and the other lock request. The lock request contention signal LCN0 is input to both AND gates 204 and 205. The AND gates 204 and 205 also receive an inverted signal RQSCC0 through a gate 203 and a non-inverted signal RQSCT0, respectively, of the lock success signal RQSC0.

Outputs from the AND gates 204 and 205 are supplied to a flip-flop 7 as set and reset signals LVST and LVRT, respectively. A Q output of the flip-flop 7 is a high priority signal LVH and is output as a high priority request RQH0 through an AND gate 206. A $\bar{Q}$ output of the flip-flop 7 is a low priority signal LVL and is output as a low priority request RQL0 through an AND gate 207. The "own" lock request signal RQ0 is used as a gate signal for the AND gates 206 and 207.

The operation of the priority setting circuit 1 shown in FIG. 2 will be described.

Assume that when the lock request signal RQ0 from the processor 10 is set at logic "1", the lock request signals RQ1 and RQ2 from the other processors 20 and 30, respectively, are set at logic "1". The lock request contention signal LCN0 is set at "1" by the OR and AND gates 202 and 201. In this case, when the value of the flip-flop 7 is at "0", that is, when the low priority signal LVL is at logic "1", the low priority request RQL0 is set at logic "1", and thus the lock request signal RQ0 from the processor 10 is input to the low priority request selector 6. When the lock request RQ0 from the processor 10 is not selected, since the lock success signal RQSC0 is at "0", a lock failure signal RQSCC0 is set at "1" through an inverter 203. The level flip-flop set signal LVST is set at "1" through the AND gate 204 and the flip-flop 7 is thus set. Therefore, the high priority request RQH0 is set at "1". In other words, the lock request from the processor 10 is upgraded from a low priority level request to a high priority level request, i.e., its selection priority is upgraded. When a next lock request contention occurs, i.e., when the lock contention signal LCN0 is set at logic "1" and the lock success signal RQSC0 is set at logic "1", the flip-flop reset signal LVRT is set at logic "1", and the flip-flop 7 is reset. More specifically, the valve of the flip-flop 7 is changed only when a contention occurs between the processor 10 and other processors 20 and 30. When the processor 10 wins the contention or has a priority over the other processors 20 and 30, the flip-flop 7 is reset and a next lock request is downgraded to a low priority level request. When the processor 10 fails the contention, the flip-flop 7 is set and a next lock request is upgraded to a high priority request.

With this operation, when a processor wins a lock request contention with other processors and its "own" lock request has succeeded, the following "own" lock request from the winning processor is downgraded. As a result, even if lock requests of high priority are continuously generated, a lock request of low priority is accepted, and lock request selection is made substantially uniform.

In this embodiment, priority selection among lock requests from a plurality of data processors for a shared main memory is described. However, the present invention can be similarly adapted for priority selection among use requests for another type of shared unit.

As described above, according to the present invention, a flip-flop is provided to the priority setting circuit so that the priority of the lock requests is reset in accordance with the contention result when a lock request contention occurs among the processors. As a result, even if a certain processor fails in a contention, the priority of its next request is always upgraded, and priority selection among lock requests when a lock contention occurs among a plurality of processors can be uniformly performed with compact hardware. In addition, even if the number of the processors is increased, the same effect can be expected only by increasing the size of hardware of the selector.

What is claimed is:

1. A priority selector system, including an information source and a plurality of processors sharing said information source and supplying requests for use of said information source, for setting priority for said requests to allow use of said information source, said priority selector system comprising:

a plurality of lock request priority setting means for setting priority for said requests, each setting means having a corresponding processor of said processors and receiving said requests and each setting means, when a contention occurs between an own request form said corresponding processor and at least one other request from another processor, upgrading a non-permitted own request as a high priority request when another request is permitted, and each setting means downgrading a following own request as a low priority request, when said own request is permitted; and request selection means, connected to said plurality of lock request priority setting means, for selecting a high priority request prior to a low priority request, and for selecting a request in accordance with a predetermined priority when said requests for use of said information source have a same priority;

wherein each of said plurality of lock request priority setting means includes means for detecting said contention between said own request and said other request and for generating a lock request contention output signal;

means for detecting lock success of said own request and for generating a lock success output signal; and a flip-flop which is set and rest in accordance with a combination of said output signals from said means for detecting said contention and said means for detecting lock success to output high and low priority request signals;

wherein said request selection means has a first selector for outputting a high priority request from each of said plurality of lock request priority setting means in accordance with said predetermined priority, and a second selector for receiving high and low priority requests supplied from said plurality of lock request priority setting means and, when no high priority request is supplied, selecting a low priority request in accordance with said predetermined priority, output signals form said first and second selectors being supplied to said plurality of processors and said plurality of lock request priority setting means.

* * * * *